(12) United States Patent
Chang et al.

(10) Patent No.: US 7,336,628 B2
(45) Date of Patent: Feb. 26, 2008

(54) SIGNALING METHOD FOR PAGING IN A MOBILE COMMUNICATION SYSTEM FOR HIGH-SPEED PACKET DATA TRANSMISSION

(75) Inventors: Yong Chang, Songnam-shi (KR); Nae-Hyun Lim, Seoul (KR); Bill Semper, Richadson, TX (US)

(73) Assignee: Samsung Electronics Co., Ltd. (KR)

( * ) Notice: Subject to any disclaimer, the term of this patent is extended or adjusted under 35 U.S.C. 154(b) by 1180 days.

(21) Appl. No.: 10/308,490

(22) Filed: Dec. 3, 2002

(65) Prior Publication Data

US 2003/0223383 A1    Dec. 4, 2003

(30) Foreign Application Priority Data

Jun. 3, 2002  (KR) ................ 10-2002-0031190

(51) Int. Cl.
  *H04B 7/00* (2006.01)
  *H04Q 7/20* (2006.01)
(52) U.S. Cl. ............. 370/310; 455/404.2; 455/435.1; 455/458
(58) Field of Classification Search ........ 370/310, 370/312, 313, 310.2; 455/432, 436, 435, 455/404.2, 458
See application file for complete search history.

(56) References Cited

U.S. PATENT DOCUMENTS 6,501,760 B1 * 12/2002 Ohba et al. ............ 370/395.42
6,704,295 B1 * 3/2004 Tari et al. ................ 370/270
6,922,561 B2 * 7/2005 Chen et al. ............. 455/435.1
2002/0193110 A1 * 12/2002 Julka et al. ................ 455/432

* cited by examiner

Primary Examiner—Tilahun Gesesse
(74) Attorney, Agent, or Firm—The Farrell Law Firm, PC

(57) ABSTRACT

A signaling method for transmitting packet data including information indicating an MN ID of one target access terminal (AT) among a plurality of ATs from a packet data service node (PSDN) to the target AT in a mobile communication system including a service system connected to the PDSN and a data location register (DLR), a plurality of access systems each having an access network controller (ANC) connected to the service system, and a plurality of access terminals (ATs) for communicating by radio with the access systems. In the signaling method, upon receipt of a message informing the access system of arrival of the packet data, the access system transmits a Paging Request message to the DLR. Upon receipt of the Paging Request message, the DLR storing location information of the plurality of ATs within areas of the plurality of access systems searches a location of the target AT. The DLR transmits a Paging Response message including a return of the Paging Request message through the service system to a, target access system where the target AT is located among the plurality of access systems, and transmits a Paging Command message to the target AT. Upon receipt of a Connection Request message for the packet data from the target AT, the service system transmits the packet data to the target AT through the target access system.

17 Claims, 4 Drawing Sheets

SIGNALING METHOD FOR PAGING IN A MOBILE COMMUNICATION SYSTEM FOR HIGH-SPEED PACKET DATA TRANSMISSION

PRIORITY

This application claims priority to an application entitled "Signaling Method for Paging in a Mobile Communication System for High-Speed Packet Data Transmission" filed in the Korean Industrial Property Office on Jun. 3, 2002 and assigned Serial No. 2002-31190, the contents of which are hereby incorporated by reference herein.

BACKGROUND OF THE INVENTION

1. Field of the Invention

The present invention relates generally to a signaling method in a mobile communication system, and in particular, to a signaling method in a mobile communication system providing a high-speed data service.

2. Description of the Related Art

A mobile communication system provides a subscriber with a voice or data service even though the subscriber is mobile by communicating through an RF (Radio Frequency) channel rather than by wire. The mobile communication system has developed from analog communication to digital communication. In the digital communication service, a system providing a voice-only service has developed into a system providing a data service as well.

A data communication service provided by the mobile communication system ranges from a short message service to simple Internet communication and file transfer services.

To provide these services to a mobile terminal, the mobile terminal interfaces with access network transceiver systems. Hence, a switching system typically provides a signaling process through which the switching system pages the mobile terminal and the mobile terminal responds to the paging. For this signaling process, the mobile communication system must know the location information of the mobile terminal. Therefore, the mobile communication system includes a home location register (HLR), and every switching system has a visitor location register (VLR). If it is necessary to page a specific mobile terminal, the signaling process is performed after the switching system acquires the location of the mobile terminal through the VLR or HLR. The location acquiring process is necessary because the location of the mobile terminal may be continuously changed. Therefore, the mobile terminal periodically implements a location registering procedure according to a predetermined method. Then the mobile communication system can page the mobile terminal after acquiring the location of the mobile terminal. The paging can be divided into paging for voice communication and paging for data transmission.

On the other hand, there is a demand for the mobile communication system to be provided with large amounts of information at high speed, for example, by introducing a high-speed data transmission system, such as the "1×EV-DO (EVolution-Data Only) system". In the mobile communication system for high-speed data transmission, data can be transmitted at high speed unlike a system providing a voice-only service. Since the mobile communication system for high-speed data transmission is for transmitting only data, it is different in structure from a voice-based system. However, the mobile communication system for high-speed data transmission also demands paging. Therefore, the paging method corresponding to the different structure of high-speed data transmission is needed.

SUMMARY OF THE INVENTION

It is, therefore, an object of the present invention to provide a signaling method for paging between a data location register and an access network controller in order to transmit packet data to an access terminal, such as a mobile station (MS), in a mobile communication system supporting high-speed data transmission.

According to an aspect of the present invention, there is provided a signaling method for transmitting packet data including information indicating an MN ID (Mobile Node IDentifier) of one target access terminal (AT) among a plurality of ATs from a packet data service node (PSDN) to the target AT in a mobile communication system including a service system connected to the PDSN and a data location register (DLR), a plurality of access systems each having an access network controller (ANC), such as a base station controller (BSC), connected to the service system, and a plurality of access terminals (ATs) for communicating by radio with the access systems. In the signaling method, upon receipt of a message informing the access system of arrival of the packet data, the access system transmits a Paging Request message to the DLR. Upon receipt of the Paging Request message, the DLR storing location information of the plurality of ATs within areas of the plurality of access systems searches a location of the target AT. The DLR transmits a Paging Response message including a return of the Paging Request message through the service system to a target access system where the target AT is located among the plurality of access systems, and transmits a Paging Command message to the target access system, and upon receipt of a Paging Command message, the target access system transmits a paging message to the target AT. Upon receipt of a Connection Request message for the packet data from the target AT, the service system transmits the packet data to the target AT through the target access system.

According to another aspect of the present invention, there is provided a signaling method for transmitting packet data including information indicating an MN ID (Mobile Node IDentifier) of one target access terminal (AT) among a plurality of ATs from a packet data service node (PSDN) to the target AT in a mobile communication system including a service system which is connected to the PDSN and has a data location register (DLR), and a plurality of access systems each having an access network controller (ANC) connected to the service system, and a plurality of ATs for communicating by radio with the access systems. In the signaling method, upon receipt of the packet data from the PDSN, the DLR storing location information of the plurality of ATs within areas of the plurality of access systems searches a location of the target AT. The service system transmits a Paging Request message to a target access system where the target AT is located among the plurality of access systems and the target access system transmits a Paging message to the target AT. Upon receipt of a Connection Request message for the packet data from the target AT, the service system transmits the packet data to the target AT through the target access system.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
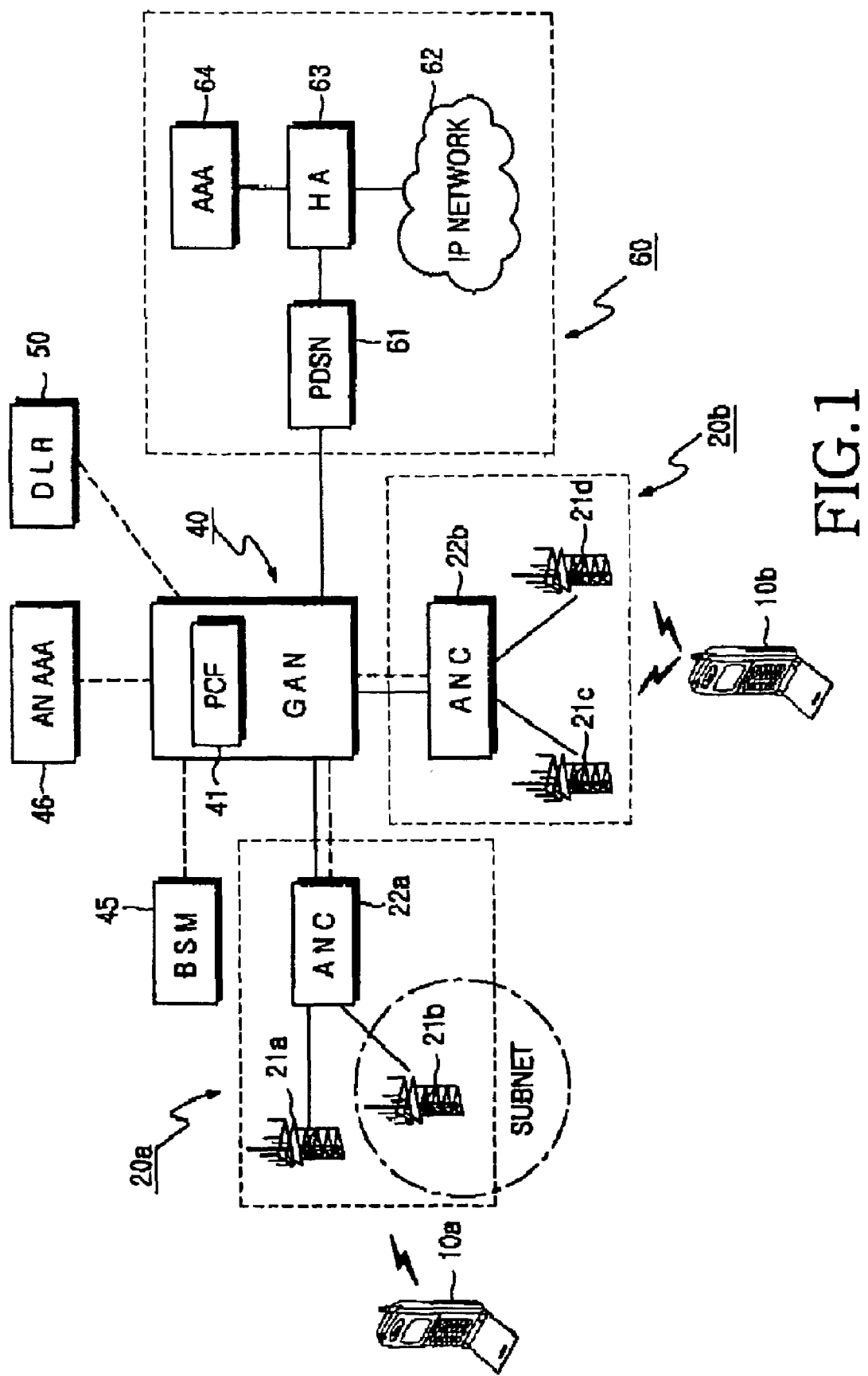
FIG. 1 illustrates a structure of a mobile communication system according to a preferred embodiment of the present invention.

Referring to FIG. 1, a mobile communication system for high-speed data transmission includes an Internet network 60, a service system 40, access systems 20a and 20b, and access terminals (ATs, or mobile terminals) 10a and 10b.

The Internet network 60 includes an IP (Internet Protocol) network 62 for performing connection with the Internet, and a home agent (HA) 63 connected to the IP network 62, for transmitting packet data received from the Internet. The Internet network 60 also includes a packet data service node (PDSN) 61 for transmitting packet data received from the HA 63 to the service system 40, and an authentication, authorization and accounting server (AAA) 64 connected to the HA 63, for performing authentication, authorization and accounting on the packet data.

The service system 40 includes a packet control function block (PCF) 41 for managing the packet data received from the PDSN 61. The service system 40 is connected to a data location register (DLR) 50 for storing the location information of the access terminals 10a and 10b. The service system 40 is also connected to a base station manager (BSM) 45 and to an access network authentication, authorization and accounting server (AN AAA) 46 for performing authorization, authorization and accounting on information included in the access network transceiver systems (ANTSs) 21a, 21b, 21c and 21d.

The access system 20a (or 20b) includes a plurality of ANTSs 21a and 21b (or 21c and 21d) for communicating through a radio channel with the AT 10a (or 10b), and an access network controller (ANC) 22a (or 22b) connected to the service system 40, for controlling the ANTSs 21a and 21b (or 21c and 21d).

A description will be made of a signaling procedure between the DLR and ANC in a mobile communication system for high-speed packet data transmission according to a preferred embodiment of the present invention. ANTS may be, for example, base transceiver stations (BTS).

Figure 2:
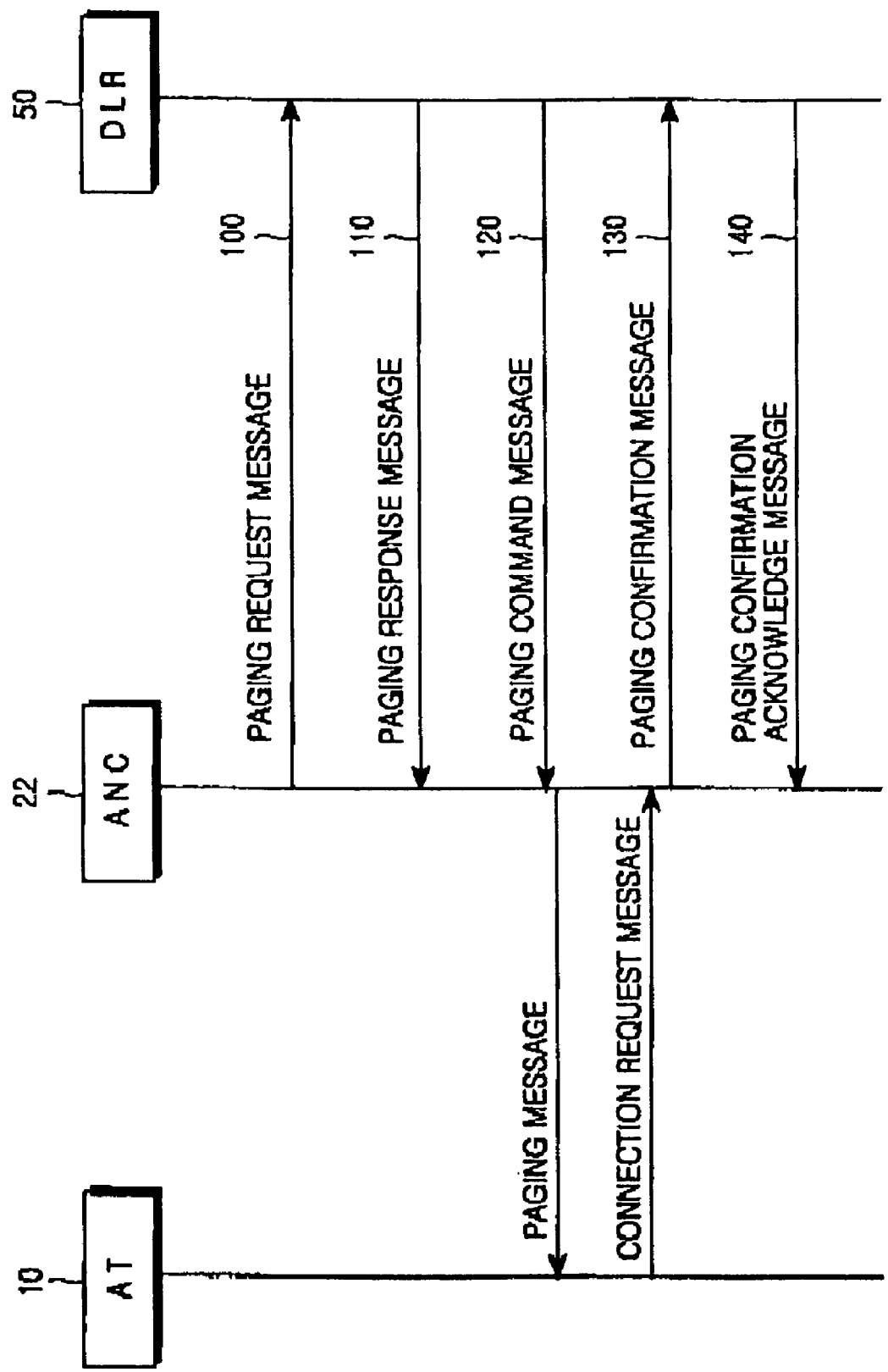
FIG. 2 illustrates a signaling procedure of a mobile communication system according to a preferred embodiment of the present invention.

Referring to FIG. 2, if packet data is received from the Internet network 60, the PCF 41 informs the corresponding ANC (for example, ANC 22a) that the packet data has arrived. The ANC 22a then transmits a Paging Request message (PageReq message) to the DLR 50 at step 100. The DLR 50 confirms information included in the received Paging Request message and transmits a response to the Paging Request message (Paging Response message) to the ANC 22a at step 110. Table 1 below shows the information included in the Paging Request message.

TABLE 1

| Information Element | Type |
| --- | --- |
| Message Type | M |
| Message Length | M |
| TID | M |
| PAGE_TYPE | M |
| UATI | M |
| MN ID | O |

As shown in Table 1, the Paging Request message includes Message Type, Message Length, TID (Transaction IDentifier), PAGE-TYPE, and UATI (Unicast Access Terminal Identifier) information. The above information is mandatory elements designated by "M" in Table 1. The Paging Request message also includes MN ID (Mobile Node IDentifier, or IMSI (International Mobile Subscriber Identity)) information allocated to the ATs 10a and 10b during manufacturing. The MN ID information is an optional element designated by "O" in Table 1, which is additionally carried only by request. The UATI is temporarily allocated to the AT by request. In the following Tables, "M" and "O" are also used to designate "mandatory" or "optional" information. A field structure of the PAGE_TYPE information is indicated in Table 2. Table 3 shows PAGE_TYPE values and their meanings.

In Table 2, Element Identifier, Length and PAGE_TYPE value constitute 0th to 7th bits of first to third fields.

In Table 3, the PAGE_TYPE Values H'01, H'02, H'03 and H'04 respectively indicate paging for packet data termination, paging for access terminal authentication, paging for session negotiation, and paging for dormant H/O (Handover), and are represented as names indicated by "Name". In the preferred embodiment of the present invention, the paging for packet data termination among these PAGE_TYPE values will be described by way of example.

TABLE 2

| 7 | 6 | 5 | 4 | 3 | 2 | 1 | 0 | Octet |
| --- | --- | --- | --- | --- | --- | --- | --- | --- |
| Element Identifier | | | | | | | | 1 |
| Length | | | | | | | | 2 |
| PAGE_TYPE value | | | | | | | | 3 |

TABLE 3

| PAGE_TYPE Value | Name | Meaning |
| --- | --- | --- |
| H'01 | Page_For_Term | Paging for packet data termination |
| H'02 | Page_For_Auth | Paging access terminal authentication |
| H'03 | Page_For_SessionNego | Paging for session negotiation |
| H'04 | Page_For_DormantHO | Paging for dormant H/O |

The DLR 50 confirms information included in the Paging Request message and transmits a Paging Response message (PageRsp message) to the ANC 22 at step 110. If the Paging Request message includes the MN ID information, it is checked whether a tuple corresponding to the UATI exists. If the tuple corresponding to the UATI exists and if the tuple is identical to the received MN ID, Return (RET) information, which will be described further below, is set as "SUCCESS".

Table 4 below shows information included in the Paging Response message.

TABLE 4

| Information Element | Type |
|---|---|
| Message Type | M |
| Message Length | M |
| TID | M |
| RET | M |

As shown in Table 4, the Paging Response message includes Message Type, Message Length, and TID information. These elements are mandatory as designated by "M". The Paging Response message also includes RET information as a mandatory element. The field structure of the RET information is illustrated in Table 5. Table 6 shows RET values and their meanings.

TABLE 5

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| | | | RET value | | | | | 3 | storage information of the UATI included in the Paging Request message, the RET value is set to H'01 representing "SUCCESS". Even if the MN ID is not received and storage information of the UATI exists, the RET value is set to H'01 of "SUCCESS" and included in the Paging Response message to be transmitted to the ANC 22a.

The RET value H'21 is classified as Resource. The RET values H'31 to H'35 are classified as Processing. As examples of the RET values set in the case where paging is abnormally performed, H'31 of "UNKNOWN_UATI" indicates that the storage information corresponding to the received UATI does not exist, and H'34 of "MN_ID_MISMATCHED" indicates that the MN ID is not identical to the storage information corresponding to the UATI.

The RET values H'41 to H'4F representing a protocol-related processing result are classified as Protocol. The RET value H'51 is classified as PPS, and H'FF is classified as a general error due to other causes.

While the RET values have been described only with respect to their meanings relating to the preferred embodiment of the present invention, the meanings and names of the other RET values are indicated in Table 6. The RET information is included in the Paging Response message transmitted to the ANC 22a.

While performing step 110, the DLR 50 searches the storage information of the UATI, searches location registration information which will be described below, and prepares for first paging.

TABLE 6

| Class | RET Value | Name | Meaning |
|---|---|---|---|
| Normal | H'01 | SUCCESS | Return of message is successful. |
| | H'02 | DUPLICATED_UATI | Duplicated UATI having the same MN ID exists. |
| Resource | H'21 | NO_UATI_AVAILABLE | UATI resource to be allocated is short. |
| Processing | H'31 | UNKNOWN_UATI | Received UATI is not allocated UATI. |
| | H'32 | AUTHENTICATION_FAILED | Failure in SHA-1 authentication specified in IS-856. |
| | H'33 | STAIL_OLDUATI | MN ID or session information corresponding to received OldUATI does not exist. |
| | H'34 | MN_ID_MISMATCHED | Transmitted MN ID is different from stored value. |
| | H'35 | LOC_Unavailable | Location information of AT is not clear. |
| Protocol | H'41 | INVALID_MESSAGE_TYPE | Message type is unknown. |
| | H'42 | MANDATORY_ELEMENT_OMITTED | Mandatory parameter has been omitted. |
| | H'43 | UNKNOWN_ELEMENT | Unknown parameter has been received. |
| | H'44 | INVALID_ELEMENT | Contents of parameter are invalid. |
| | H'4F | GENERAL_PROTOCOL_ERROR | Failure in processing of other protocol. |
| PPS | H'51 | PPS_Not_OK | PPS subscribers are unlimited. |
| ETC | H'FF | GENERAL_ERROR | Failure due to the other causes. |

In Table 5, Element Identifier, Length and RET value constitute 0th to 7th bits of first to third fields, respectively.

Referring to Table 6, the RET value is classified into Normal, Resource, Processing, Protocol, PPS (Pre-Paid Subscriber), and ETC. The RET values H'01 and H'02 are classified as Normal. The RET value H'01 indicates that paging has normally been performed. If the DLR 50 has The DLR 50 transmits a Paging Command message (PageCmd message) including cell identifier list information to the ANC 22a where the AT 10a is located to perform a first paging procedure. The PageCmd message may be sent to adjacent ANCs in conjunction with (or alternative to) sending it to ANC 22a. The cell identifier list information is the location information of the AT 10a having the corresponding UATI information. The ANC 22a which has received the Paging Command message transmits the Paging message to the AT 10a having the corresponding UATI through the corresponding ANTS 21b. In this case, UATI information is newly assigned by the DLR 50, and the PAGE_TYPE value included in the Paging Request message is also transmitted as PAGE_TYPE information in the Paging Command message, as described further below. After transmitting the Paging Command message, the DLR 50 sets a timer and waits for a Paging Confirmation message (PageConf message) 130 which will be described below.

Table 7 below illustrates information included in the Paging Command message 120.

TABLE 7

| Information Element | Type |
| --- | --- |
| Message Type | M |
| Message Length | M |
| TID | M |
| PAGE_TYPE | M |
| PAGE_COUNT | M |
| UATI | M |
| Cell Identifier List | M |
| Paging Parameter | M |
| HW ID | O |

As shown in Table 7, the Paging Command message includes, as mandatory information elements, Message Type, Message Length, TID received through the Paging Request message, PAGE_TYPE (set as the PAGE_TYPE value of Table 3), UATI of the corresponding AT, PAGE_COUNT for counting the order of requested paging, Cell Identifier List indicating information of corresponding ANTSs to which the paging message is to be transmitted, and Paging Parameter. The Paging Command message also includes HW (Hardware) ID information additionally included only by request. A field structure of the PAGE_COUNT information is indicated in Table 8. Table 9 shows PAGE_COUNT values and their orders.

In Table 8, Element Identifier, Length and PAGE_COUNT value constitute 0th to 7th bits of first to third fields, respectively.

TABLE 8

| 7 | 6 | 5 | 4 | 3 | 2 | 1 | 0 | Octet |
| --- | --- | --- | --- | --- | --- | --- | --- | --- |
| | | | Element Identifier | | | | | 1 |
| | | | Length | | | | | 2 |
| | | | PAGE_COUNT value | | | | | 3 |

TABLE 9

| PAGE_COUNT Value | Name |
| --- | --- |
| H'01 | First_Paging |
| H'02 | Second_Paging |

Between steps 120 and 130, the ANC 22a which has received the Paging Command message performs paging to the AT 10a through the ANTS 21b. If the paging is successfully performed, the AT 10a transmits a Connection Request message to the ANC 22a. The ANC 22a then confirms the location of the AT 10a in response to the Paging Command message and transmits to the DLR 50 the Paging Confirmation message 130 indicating that the connection is established.

Table 10 below shows information included in the Paging Confirmation message.

TABLE 10

| Information Element | Type |
| --- | --- |
| Message Type | M |
| Message Length | M |
| TID | M |
| PAGE_TYPE | M |
| Location Registration | M |
| Authentication Parameter | M |

As indicated in Table 10, the Paging Confirmation message includes, as mandatory elements, Message Type (received through the Paging Command message), Message Length, TID, and PAGE_TYPE information. The Paging Confirmation message also includes, as mandatory elements, Location Registration information representing the information of the ANTS where the AT is currently located, and Authentication Parameter information for authenticating a return of the Paging Command message.

The DLR 50 which has received the Paging Confirmation message 130 terminates a paging procedure if the Paging Confirmation message corresponding to the same UATI is received before a lapse of time set by the timer, as identified by the same TID in the Paging Confirmation message. In this case, the DLR 50 stores the location information as the received registration information value. The DLR 50 sets RET information, which will be described below, to "SUCCESS" and transmits a Paging Confirmation Acknowledge message (PageConfAck message) to the ANC 22a at step 140. If the DLR 50 is requested to transmit session information through the Paging Confirmation message, the DLR 50 transmits the Paging Confirmation Acknowledge message including updated session information to the ANC 22a.

On the other hand, if the first paging fails, the DLR 50 transmits RET information corresponding to a cause of failure to the ANC 22a through the Paging Confirmation Acknowledge massage. Thereafter, the DLR 50 retransmits the Paging Command message to the ANC 22a. That is, if the DLR 50 does not receive the Paging Confirmation message within a time set by the timer (not shown), a second paging process is performed. The second paging process performed in a second paging area repeats the same process as the above described first paging process. If the time set by the timer elapses, the paging process is terminated. Table 11 below indicates information included in the Paging Confirmation Acknowledge message. Table 12 shows binary values of the RET information and their meanings.

TABLE 11

| Information Element | Type |
| --- | --- |
| Message Type | M |
| Message Length | M |
| TID | M |
| RET | M |
| MN ID | O |
| Paging Parameter | O |
| QoS Parameter | O |
| Session Configuration Records | O |
| HW ID | O |

TABLE 12

| Class | Binary Value | Meaning |
| --- | --- | --- |
| Normal | B'0000~B'0001 | Return of message is successful. |
| Resource | B'0010 | Failure due to shortage of resource etc. |
| Processing | B'0011~B'0100 | Failure in service. |
| Message Invalid | B'0101 | Failure in message transmission due to erroneous message or error in TID. |
| Protocol Error | B'0110 | Failure due to error in parameter. |
| Authentication Failure | B'0111 | Failure in authentication. |
| Reserved | B'1000~B'1110 | Unused |
| ETC | B'1111 | Failure due to the other causes. |

As shown in Table 11, the Paging Confirmation Acknowledge message includes as mandatory elements, Message Type, Message Length, TID, and RET information. As optional elements additionally included only when requested from the ANC, the Paging Confirmation Acknowledge message includes MN ID, Paging Parameter, QoS (Quality of Service) Parameter, Session Configuration Records, and HW ID.

Among the RET values included in the Paging Confirmation Acknowledge message, shown in Table 12, the RET values B'0000~B'0001 classified as Normal indicate that the paging is successfully performed. The other RET values B'0010, B'0011~B'0100, B'0101, B'0110, B'0111, B'1000~B'1110, and B'1111 are classified as Resource, Processing, Message Invalid, Protocol Error, Authentication Failure, Reserved, and ETC, respectively, according to causes of failure.

In FIG. 1, although the DLR 50 and PCF 41 are separated provided, another preferred embodiment of the present invention comprises a signaling procedure between the DLR where the DLR is combined with the PCF and the ANC.

Figure 3:
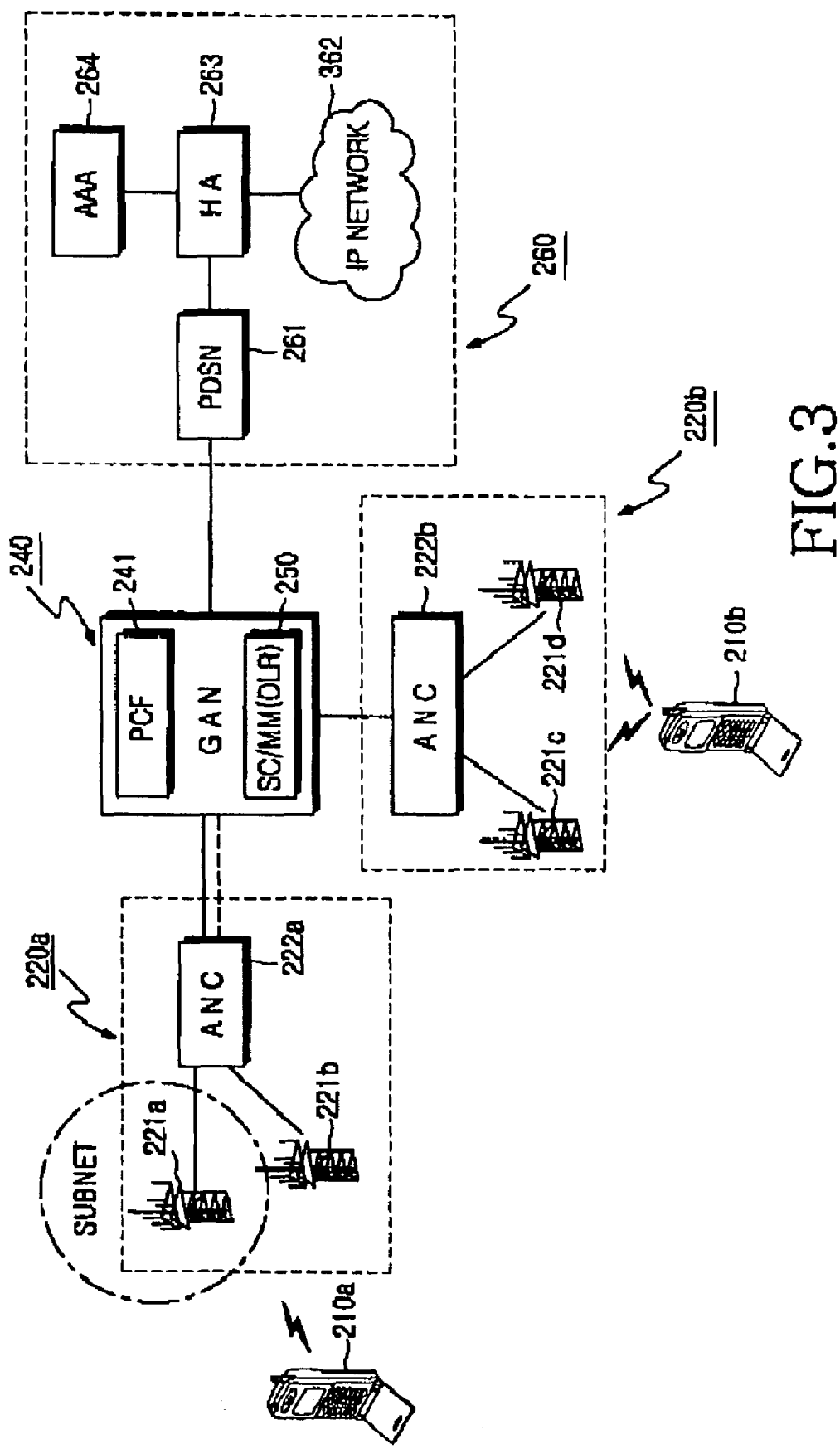
FIG. 3 illustrates a structure of a mobile communication system according to another preferred embodiment of the present invention.
Figure 4:
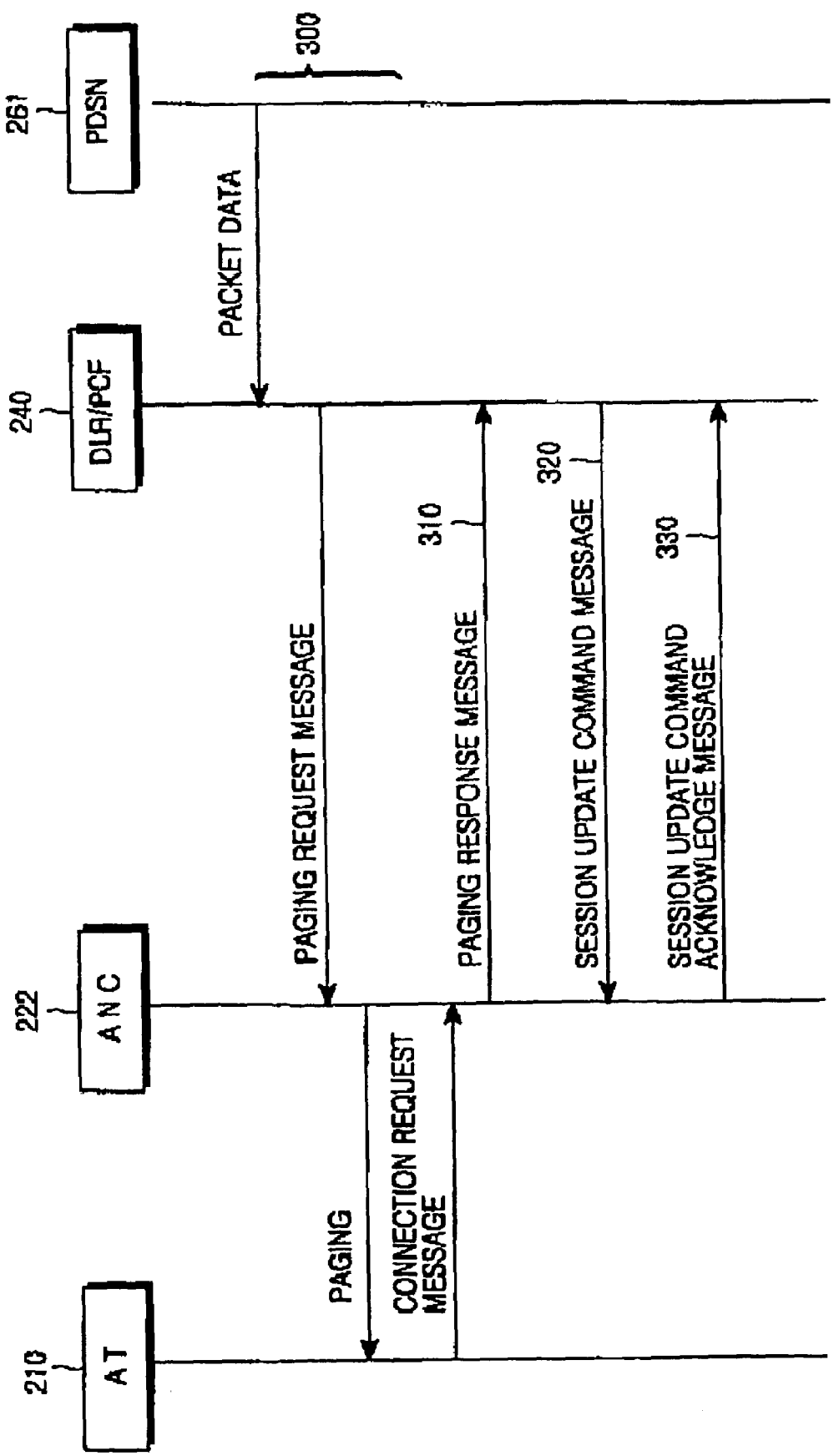
FIG. 4 illustrates a signaling procedure of a mobile communication system according to another preferred embodiment of the present invention.

FIG. 3 illustrates a mobile communication system according to another preferred embodiment of the present invention, and FIG. 4 illustrates a paging process according to another preferred embodiment of the present invention.

The mobile communication system shown in FIG. 3 has the same construction as that shown in FIG. 1, except that a DLR 250 and a PCF 241 are combined in the same equipment. The DLR 250 is a logic sub-system having the same function as the DLR 50 shown in FIG. 1. The DLR 250 is also called a session controller/mobility manager (SC/MM).

A description will be made of a signaling procedure of the mobile communication for high-speed packet data with reference to FIGS. 3 and 4.

Referring to FIG. 4, if a service system 240 receives packet data from an Internet network 260, the PCF 241 informs the DLR 250 of arrival of the packet data at step 300. The DLR 250 then checks received UATI information and location information of an AT 210a and transmits RET information to the PCF 241, also as part of step 300. The PCF 241 transmits a Paging Request message to an ANC 222b, also as part of step 300. The PCF 241 may also transmit the Paging Request message to ANCs 222a and to other adjacent ANCs. In FIG. 1, the PCF 41 transmits the Paging Request message through the ANC 22a to the DLR 50. Then the DLR 50 transmits the Paging Response message to the ANC 22a. However, since the DLR 250 is combined with the PCF 241 as shown in FIG. 3, if the PCF 241 transmits the Paging Request message to the ANC 222a, the ANC 222a does not transmit the Paging Response message to the DLR 250.

If the ANC 222b which has first received the Paging Request message does not include information of a corresponding AT, the DLR 250 transmits the Paging Request message to adjacent other ANCs to confirm whether they include information of a corresponding AT, and retransmits the Paging Request message to the ANC 222a which has information of a corresponding AT. The DLR 250 also operates a paging timer (not shown), and the ANC 222b operates an ANTS timer (not shown) to determine whether the Paging Response message is received from the ANC 222a within a set time.

The ANC 222a transmits a Paging message to the AT 210a. Upon receipt of the Paging message, the AT 210a transmits a Connection Request message (ConnectionReq message) for performing a connection establishing process to the ANC 222a. At step 310, the ANC 222a transmits a Paging Response message to the DLR 250 through the ANC 222b which has first received the Paging Request message. At this time, the ANC 222b stops operating the ANTS timer, and the DLR 250 stops operating the paging timer.

Upon receipt of the Paging Response message, the DLR 250 transmits a Session Update Command message to the ANC 222a at step 320. The Session Update Command message is transmitted when the status of the AT is changed or specific information of the AT needs to be changed. In addition, if it is necessary to update information about session, the Session Update Command message is transmitted. The transmission process of the Session Update Command message corresponds to that of the Paging Confirmation Acknowledge message 140 described in the preferred embodiment of FIG. 1. Upon receipt of the Session Update Command message, the ANC 222a transmits a Session Update Command Acknowledge message (Session Update Command Ack message) to the DLR 250 at step 330. Then the connection between the ANC 222a and the AT 210a is established. The packet data can then be transmitted at high speed between the PDSN 261 and the AT 210a.

As described above, a paging system such as the DLR for storing information of the AT and a switching system is newly introduced to provide the AT with a high-speed data service, and the paging-related message information is newly specified, thereby improving subscriber capacity and data rate. Consequently, the paging procedure between the ANTSs and ATs is rapidly performed and a high-speed data service can be provided.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A signaling method for transmitting packet data to a target AT in a mobile communication system including a data location register (DLR), a plurality of access systems, and a plurality of access terminals (ATs) for communicating by radio with the access systems, the method comprising the steps of:

upon receipt of the packet data, transmitting a Paging Request message to the DLR by the access system;

upon receipt of the Paging Request message, searching by the DLR a location of the target AT among stored location information of the plurality of ATs;

transmitting by the DLR a Paging Response message to a target access system where the target AT is located, and transmitting a Paging Command message to the target access system; and upon receipt of the Paging Command message, transmitting by the target access system a Paging message to the target AT;

upon receipt of a Connection Request message for the packet data from the target AT, transmitting the packet data to the target AT by the target access system.

2. The signaling method of claim 1, wherein the Paging Request message includes Message Type, Message Length, TID (Transaction IDentifier) and PAGE-TYPE indicating which one is being transmitted among packet, data termination, authentication, session negotiation and dormant handoff, and UATI (Unicast Access Terminal Identifier) information.

3. The signaling method of claim 2, wherein the Paging Request message further includes MN ID (Mobile Node Identifier).

4. The signaling method of claim 1, wherein the Paging Response message includes Message Type, Message Length, TID (Transaction IDentifier) information and an RET value indicating a result of processing.

5. The signaling method of claim 1, wherein the Paging Command message includes Message Type, Message Length, TID received through the Paging Request message, and PAGE_TYPE indicating which one is being transmitted among packet data termination, authentication, session negotiation and dormant handoff, and UATI of the corresponding AT, PAGE_COUNT for counting the order of requested paging, Cell Identifier List indicating information of corresponding ANTSs to which the paging message is to be transmitted, and Paging Parameter.

6. The signaling method of claim 5, wherein the Paging Command message further includes HW (Hardware) ID information.

7. The signaling method of claim 1, further comprising the steps of:

upon receipt of the Connection Request message from the target AT by the target access system, transmitting by the target access system to the DLR a Paging Confirmation message in response to the Paging Command message; and updating a current location information, performing authentication, and transmitting a Paging Confirmation Acknowledge message by the DLR to the target access system.

8. The signaling method of claim 7, wherein the Paging Confirmation message includes Message Type received through the Paging Command message, Message Length, TID and PAGE_TYPE information indicating which one is being transmitted among packet data termination, authentication, session negotiation and dormant handoff and Location Registration information representing the information of the ANTS where the AT is currently located, and Authentication Parameter information for authenticating a return of the Paging Command message.

9. The signaling method of claim 7, wherein the Paging Confirmation Acknowledge message includes Message Type, Message Length, TID, and RET information indicating a result of processing.

10. The signaling method of claim 9, wherein the Paging Confirmation Acknowledge message further includes MN ID(Mobile Node Identifier), Paging Parameter, QoS (Quality of Service) Parameter, Session Configuration Records, and HW ID.

11. The signaling method of claim 7, further comprising the step of retransmitting the Paging Command message to the target access system by the DLR when the Paging Confirmation message is not received from the target access system for a predetermined time.

12. A signaling method for transmitting packet data to a target AT in a mobile communication system including a service system which has a data location register (DLR), and a plurality of access systems, and a plurality of ATs for communicating by radio with the access systems, the method comprising the steps of:

upon receipt of the packet data, searching by the DLR in the service system for a location of the target AT among stored location information of the plurality of ATs;

transmitting by the service system a Paging Request message to a target access system where the target AT is located;

upon receipt of the Paging Request message, transmitting a Paging message to the target AT by the target access system; and upon receipt of a Connection Request message for the packet data from the target AT, transmitting the packet data to the target AT by the target access system.

13. The signaling method of claim 12, wherein the Paging Request message includes Message Type, Message Length, TID (Transaction IDentifier) and PAGE-TYPE indicating which one is being transmitted among packet data termination, authentication, session negotiation and dormant handoff, and UATI (Unicast Access Terminal Identifier) information.

14. The signaling method of claim 13, wherein the Paging Request message further includes MN ID (Mobile Node Identifier).

15. The signaling method of claim 12, further comprising the steps of:

upon receipt of a Paging Response message in response to the Connection Request message, transmitting by the service system a Session Update Command message to the target access system according to a change in status information of the target AT; and updating the changed information by the target access system, and transmitting a Session Update Command Acknowledge message including a return of at least a portion of the Session Update Command message to the service system.

16. The signaling method of claim 15, wherein the Paging Response message includes Message Type, Message Length, TID (Transaction IDentifier) information and RET value indicating a result of processing.

17. The signaling method of claim 15, further comprising the step of retransmitting the Paging Request message to the target access system by the DLR when the Paging Response message is not received from the target access system for a predetermined time.

* * * * *